United States Patent
Wilson (10) Patent No.: US 11,531,356 B2
(45) Date of Patent: Dec. 20, 2022

(54) LANDING GEAR DEPLOYMENT

(71) Applicant: AIRBUS OPERATIONS LIMITED, Bristol (GB)

(72) Inventor: Fraser Wilson, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 316 days.

(21) Appl. No.: 16/776,896

(22) Filed: Jan. 30, 2020

(65) Prior Publication Data
US 2020/0264635 A1    Aug. 20, 2020

(30) Foreign Application Priority Data
Jan. 31, 2019   (GB) ..................................... 1901381

(51) Int. Cl.
*G05D 1/06* (2006.01)
*B64C 25/28* (2006.01)
(Continued)

(52) U.S. Cl.
CPC ........... *G05D 1/0676* (2013.01); *B64C 25/28* (2013.01); *B64D 45/0005* (2013.01); *B64D 45/04* (2013.01); *B64C 2025/003* (2013.01)

(58) Field of Classification Search
CPC .............................. G05D 1/0676; B64C 25/28; B64C 2025/003; B64C 25/26; B64C 25/30; B64C 25/10; B64D 45/0005; B64D 45/04
See application file for complete search history.

(56) References Cited

U.S. PATENT DOCUMENTS

| 5,745,053 A * | 4/1998 | Fleming, III .......... G01C 5/005 340/963 |
| 8,302,902 B2 * | 11/2012 | Lynas .................. B64D 41/007 244/102 R |

(Continued)

FOREIGN PATENT DOCUMENTS

| EP | 3 208 787 | 8/2017 |
| EP | 3208787 A2 * | 8/2017 ............... B64C 9/38 |

(Continued)

OTHER PUBLICATIONS

European Search Report cited in EP 20154930.0, dated Jun. 23, 2020, 13 pages.
(Continued)

*Primary Examiner* — Behrang Badu
*Assistant Examiner* — Jalal C Coduroglu
(74) *Attorney, Agent, or Firm* — Nixon & Vanderhye P.C.

(57) ABSTRACT

A method 300 for deploying an aircraft landing gear including: receiving an aircraft landing gear deployment signal 310, receiving an aircraft position signal indicative of a distance of the aircraft from an aircraft landing site 320, receiving one or more flight signals indicating one or more dynamic conditions or parameters relating to the flight of the aircraft 330, determining, based at least on the one or more flight signals, a first aircraft position, relative to the aircraft landing site, at which the landing gear deployment should commence 340, and deploying the landing gear (a) when the aircraft reaches the first aircraft position, in the event that the deployment signal is received before the aircraft reaches the first aircraft position, or (b) immediately, in the event that the deployment signal is received when the aircraft has passed the first aircraft position 350.

14 Claims, 5 Drawing Sheets

(51) Int. Cl.
  *B64D 45/00* (2006.01)
  *B64D 45/04* (2006.01)
  *B64C 25/00* (2006.01)

(56) References Cited

U.S. PATENT DOCUMENTS

| | | | |
|---|---|---|---|
| 10,202,204 B1* | 2/2019 | Daidzic | B64C 5/02 |
| 10,921,826 B2* | 2/2021 | Groden | G08G 5/0086 |
| 2001/0052562 A1 | 12/2001 | Ishihara et al. | |
| 2007/0055434 A1 | 3/2007 | Kohlmann | |
| 2009/0048724 A1 | 2/2009 | Caule | |
| 2013/0026291 A1* | 1/2013 | Way | B64C 25/16 |
| | | | 244/102 R |
| 2013/0026299 A1 | 1/2013 | Constans et al. | |
| 2015/0122945 A1* | 5/2015 | Kavounas | B64C 25/30 |
| | | | 244/102 R |
| 2015/0144735 A1* | 5/2015 | Lecourtier | B64C 25/16 |
| | | | 244/102 R |
| 2015/0203192 A1* | 7/2015 | Slanker | B64C 25/12 |
| | | | 244/102 R |
| 2015/0291278 A1* | 10/2015 | Allwein | B64C 25/34 |
| | | | 244/102 A |
| 2016/0245666 A1* | 8/2016 | McQuillan | G01C 23/005 |
| 2016/0362177 A1* | 12/2016 | Abarca Lopez | B64C 25/12 |
| | | | 244/102 R |
| 2017/0166323 A1* | 6/2017 | Dangler | B64D 45/0005 |
| 2017/0243495 A1* | 8/2017 | Moravek | G08G 5/0091 |
| 2018/0170529 A1* | 6/2018 | Schmidt | B64D 45/04 |
| 2018/0362151 A1* | 12/2018 | Marles | G08G 5/0086 |
| 2021/0403153 A1* | 12/2021 | Anderson | B64D 17/80 |

FOREIGN PATENT DOCUMENTS

| | | | | |
|---|---|---|---|---|
| EP | 3208787 A3 * | 12/2017 | | B64C 9/38 |
| EP | 3 339 167 | 6/2018 | | |
| EP | 3339167 A1 * | 6/2018 | | B64C 13/16 |
| EP | 3 415 419 | 12/2018 | | |
| EP | 3415419 A1 * | 12/2018 | | B64C 25/16 |

OTHER PUBLICATIONS

European Search Report cited in EP 20154930.0 dated Nov. 16, 2020, 11 pages.
MP welcomes successful LLA noise trial—http://newsroom.london-luton.co.uk/news/mp-welcomes-successful-IIa-noise-trial-281407.

* cited by examiner

LANDING GEAR DEPLOYMENT

RELATED APPLICATION

This application claims priority to United Kingdom Patent Application GB 1901381.2 filed Jan. 31, 2019, the entirety of which is incorporated by reference.

TECHNICAL FIELD

The present invention relates to systems and methods for extending an aircraft landing gear.

BACKGROUND

There is a general desire for aircraft flight to be more efficient. By way of example, efficiency can be improved by reducing flight times and reducing fuel consumption. One aspect of flight in which efficiency can be improved is aircraft landing procedures, which typically involve decreasing aircraft altitude and speed from cruise conditions and deploying the landing gear(s) of the aircraft on approach to an aircraft landing site such as an airport.

Deploying a landing gear typically involves moving a landing gear from a retracted position to an extended position. In the retracted position, the landing gear is stowed in a landing gear bay within the fuselage of the aircraft. In the extended position, the landing gear is moved outward of the fuselage into a position for supporting the aircraft upon landing. Deploying a landing gear may also involve moving one of more landing gear doors from a closed position to an open position, and then back to the closed position once the landing gear has reached the extended position.

SUMMARY

A first aspect of the present invention provides an aircraft controller configured to: receive an aircraft landing gear deployment signal, receive an aircraft position signal indicative of a distance of the aircraft from an aircraft landing site, receive one or more flight signals indicating respective one or more dynamic conditions or parameters relating to the flight of the aircraft, determine, based at least on the received one or more flight signals, a first aircraft position, relative to the aircraft landing site, at which the landing gear should be deployed and, based on the deployment signal and the aircraft position signal, trigger landing gear deployment (a) when the aircraft reaches the first aircraft position, in the event that the deployment signal is received before the aircraft reaches the first aircraft position, or (b) immediately, in the event that the deployment signal is received when the aircraft has passed the first aircraft position.

Optionally, the aircraft controller is configured to dynamically determine the first aircraft position based on changes to the received one or more flight signals over time. Optionally, the one or more flight signals indicate dynamic parameters of the aircraft. Optionally, the one or more flight signals indicate atmospheric conditions at or near the aircraft landing site.

Optionally, the aircraft controller is configured to determine a second aircraft position, relative to the aircraft landing site, which indicates the closest aircraft position to the aircraft landing site at which the landing gear can be deployed for a safe landing, and, in the event that the aircraft reaches the second position before the deployment signal has been received, automatically trigger landing gear deployment.

Optionally, the one or more flight signals comprises an aircraft speed signal, and the controller is configured to determine the second aircraft position based at least on aircraft speed and a landing gear deployment time.

Optionally, the aircraft controller is configured, in the event that the aircraft reaches the second position before the deployment signal has been received, to trigger accelerated landing gear deployment.

Optionally, the aircraft controller is configured to receive a landing gear status signal indicative of a status of the landing gear in the deployed position and trigger an automatic go-around if the landing gear status signal indicates a fault in the deployment of the landing gear.

Optionally, the aircraft controller is configured, in the event that the deployment signal is received before the aircraft reaches the first aircraft position, to trigger a pre-landing landing gear system check before triggering landing gear deployment.

Optionally, the aircraft controller comprises a memory configured to store aircraft landing site information, wherein the controller is configured to determine the first aircraft position based on the aircraft landing site information.

Optionally, the aircraft controller is configured, in the event that the aircraft reaches the first aircraft position before the deployment signal is received, to trigger an aircraft system to issue a deployment warning to the aircraft pilot.

Optionally, the aircraft controller is operable in a first mode, according to the first aspect of the invention, and in a second mode, in which, in the event that the deployment signal is received before the aircraft reaches the first aircraft position, the controller triggers landing gear deployment immediately upon receipt of the landing gear deployment signal. Optionally, the mode of the controller is selectable by the aircraft pilot.

A second aspect of the present invention provides an aircraft controller to: determine a time period and/or distance range over which deployment of a landing gear can be initiated for aircraft landing, wherein the determining is based on the prevailing conditions during the aircraft landing and information related to the aircraft and the aircraft landing site, and wherein the determined time period and/or distance range comprises a determined first portion, during which it is safe to initiate landing gear deployment, and a determined second portion, closer to aircraft landing than the first portion, during which it is safe to initiate landing gear deployment in an efficient landing mode, issue a first pilot feedback when the first portion of the determined time period and/or distance range is entered by the aircraft, the first pilot feedback indicating that it is safe to deploy the landing gear, issue a second pilot feedback when the second portion of the determined time period and/or distance range is entered by the aircraft, the second pilot feedback indicating that the landing gear can be lowered in the efficient landing mode, and initiate landing gear deployment when the aircraft is in the determined time period and/or distance range, in response to receiving a deployment signal from the pilot.

Optionally, the aircraft controller is configured to issue a pilot warning if the aircraft passes a threshold time or threshold distance before the controller receives the deployment signal from the pilot, wherein the threshold time or distance is within the determined time period and/or distance range and closer to aircraft landing than the second portion, and wherein the pilot warning indicates that landing gear deployment is required urgently.

Optionally, the aircraft controller is configured to issue a third pilot feedback in the event that the aircraft exits the determined time period and/or distance range before the controller receives the deployment signal from the pilot, the third pilot feedback indicating that initiating landing gear deployment has been performed automatically by the controller.

Optionally, the aircraft controller is configured to delay initiation of landing gear deployment until the aircraft enters the determined time period and/or distance range, in the event that the deployment signal is received before the aircraft enters the determined time period or distance range.

A third aspect of the present invention provides an aircraft landing gear system comprising: an aircraft landing gear movable between a retracted position and an extended position, an aircraft landing gear extension and retraction system configured to move the landing gear between the retracted position and the extended position, and an aircraft controller according to the first or second aspect of the present invention, wherein the system is configured such that the trigger for landing gear deployment causes the landing gear extension and retraction system to deploy the landing gear.

A fourth aspect of the present invention provides an aircraft comprising an aircraft controller according to the first or second aspect of the present invention or an aircraft landing gear system according to the third aspect of the present invention.

A fifth aspect of the present invention provides a method for deploying an aircraft landing gear. The method comprises: receiving an aircraft landing gear deployment signal, receiving an aircraft position signal indicative of a distance of the aircraft from an aircraft landing site, receiving one or more flight signals indicating one or more dynamic conditions or parameters relating to the flight of the aircraft, determining, based at least on the one or more flight signals, a first aircraft position, relative to the aircraft landing site, at which the landing gear deployment should commence, and deploying the landing gear (a) when the aircraft reaches the first aircraft position, in the event that the deployment signal is received before the aircraft reaches the first aircraft position, or (b) immediately, in the event that the deployment signal is received when the aircraft has passed the first aircraft position.

BRIEF DESCRIPTION OF THE DRAWINGS

Embodiments of the invention will now be described, by way of example only, with reference to the accompanying drawings, in which.

DETAILED DESCRIPTION

As airports around the world look to expand, there is a desire to increase air traffic without significantly increasing the environmental impact of the airport on the surrounding area and without reducing safety.

It has been found that there are benefits to delaying deployment of a landing gear during an aircraft landing procedure compared to when a landing gear is typically deployed, so that the landing gear is in a deployed state for a shorter period before aircraft landing. Such benefits may include: increasing safety by decreasing the risk of damage to the landing gear from debris, improved fuel efficiency due to decreased aircraft drag until the landing gear is deployed, reducing the noise signature of the aircraft until the landing gear is deployed (which may be of particular importance for airports close to urban areas because flying with a deployed landing gear can increase the aircraft noise signature during an approach phase by 3-5 dB) and smoother landing due to decreased turbulence during the approach.

At present, landing gear deployment is typically initiated in response to a trigger by an aircraft pilot and the landing gear remains in a deployed state as the aircraft approaches an aircraft landing site such as an airport runway. A commercial aircraft may typically comprise a nose landing gear and two main landing gears, although any other number of landing gears may be employed.

Embodiments of the invention permit landing gear deployment when an aircraft is closer to the aircraft landing site compared to a typical aircraft landing procedure. The disclosed embodiments may permit determination an optimum point or range for landing gear deployment, which may be related to specific details of the particular aircraft landing procedure i.e. related, for example, to the specific airport, the particular aircraft or aircraft type and the specific flight conditions. The disclosed embodiments may help to ensure that landing gear deployment occurs before it is no longer safe to perform landing gear deployment for a successful landing.

Figure 1:
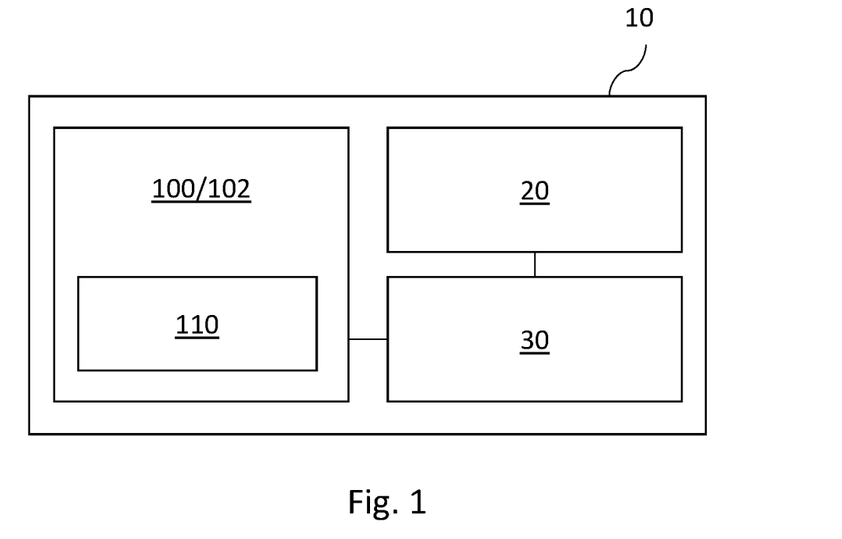
FIG. 1 is a schematic view of a landing gear system according to an embodiment of the present invention.

FIG. 1 is a schematic view of an aircraft landing gear system 10 according to an embodiment of the invention. The system 10 comprises an aircraft landing gear 20 movable between a retracted position and an extended position. The landing gear 20 may be a main landing gear or a nose landing gear. The system 10 comprises a landing gear extension and retraction system 30 configured to move the landing gear 20 between the retracted position and the extended position. In some embodiments, the system 10 may also comprise one or more landing gear doors (not shown) movable between a closed position and an open position, and the landing gear extension and retraction system 30 may be configured to move the landing gear doors between the closed position and the open position to deploy the landing gear 20.

The system 10 comprises a controller 100. The system 10 is configured such that a trigger issued by the controller 100 to initiate deployment of the landing gear 20 causes the landing gear extension and retraction system 30 to deploy the landing gear 20.

An aircraft may comprise a plurality of aircraft landing gear systems 10. Such a plurality of systems 10 may comprise a common controller 100 or each landing gear system 10 may comprise its own controller 100.

In some embodiments, the controller 100 comprises a memory 110. The memory 110 may be configured to store information received from other aircraft systems, or information relating to the aircraft landing site which the aircraft is approaching. In some embodiments, the controller 100 comprises a processor (not shown), which may be configured to access and process information stored in the memory 110. In other embodiments, the controller 100 may not comprise a memory 110 and may instead use received signals without storing the information.

Operation of a controller 100 according to the invention will now be described with reference to FIG. 2.

Figure 2:
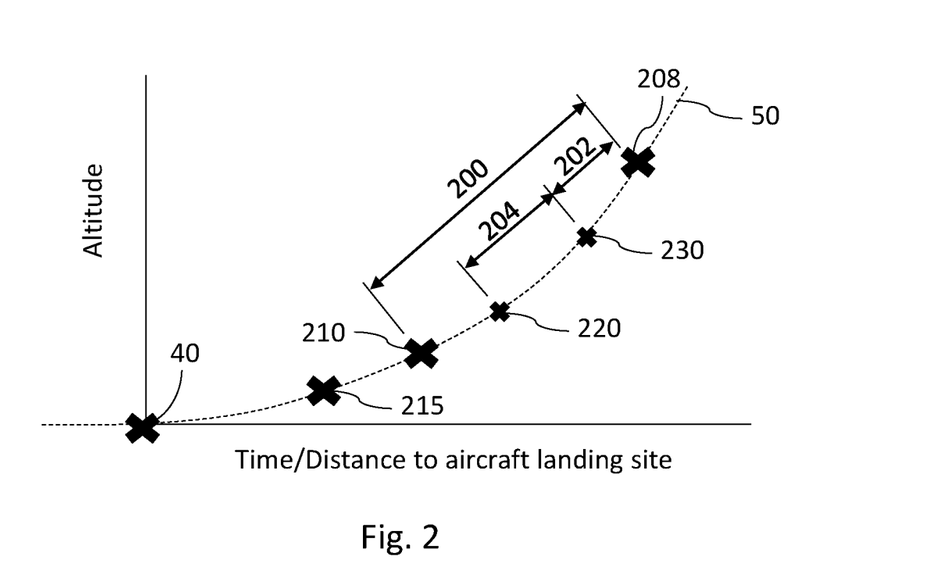
FIG. 2 is a diagram depicting an example aircraft flight path on approach to an aircraft landing site.

FIG. 2 is a schematic diagram of an aircraft flight path 50 during an aircraft landing procedure. The aircraft altitude is plotted against the time/distance to the aircraft landing site 40. In some embodiments, a controller 100 according to the invention is configured to determine a time period and/or distance range 200 over which deployment of a landing gear 20 can be initiated for aircraft landing. The determined time period 200 may span a number of minutes based on a time-to-landing. The determined time period 200 may end at a latest time-to-landing 210 at which landing gear deployment can be safely initiated. The determined distance range 200 may be a span of a number of kilometres from the aircraft landing site 40. The determined distance range 200 may end at a closest distance 210 to the aircraft landing site 40 at which the landing gear deployment can be safely initiated.

The determining of the time period and/or distance range 200 is based on the prevailing conditions during the aircraft landing and information related to the aircraft and the aircraft landing site 40. For example, the speed of the aircraft may determine the start and end points 208, 210 of the time period and/or the distance range 200. Information related to the aircraft may comprise, for example, the type of aircraft, the condition of the aircraft brakes and/or tyres, the weight of the aircraft, aircraft altitude and flap position. Information related to the aircraft landing site 40 may comprise, for example, the length of the runway, the distance along the runway at which the aircraft is to turn off, the topography of the runway and the topography below the flight path 50 on approach to the aircraft landing site 40. Information related to the prevailing conditions during the aircraft landing may comprise, for example, the temperature and weather conditions at the aircraft landing site 40 (for example, a wet or icy runway may mean a longer stopping distance and therefore earlier deployment so that the aircraft can land closer to the start of the runway), the temperature and environmental conditions surrounding the aircraft on approach, the time of day of the landing (noise restrictions may be variable throughout the day), wind direction and the direction of approach to the aircraft landing site 40.

The determined time period and/or distance range 200 may comprise a determined first portion 202, during which it is safe to initiate landing gear deployment, and a determined second portion 204, closer to aircraft landing than the first portion 202, during which it is safe to initiate landing gear deployment in an efficient landing mode. Deploying the landing gear 20 in an efficient landing mode may, for example, help to reduce overall aircraft drag during an aircraft landing procedure, or may reduce the overall noise signature of the aircraft during the aircraft landing procedure until the landing gear 20 is deployed.

The start point 208 of the determined time period and/or distance range may be determined based on, for example, a threshold aircraft altitude or a threshold time-to-landing. The end point 210 of the determined time period and/or the distance range may be based on a time required to safely deploy the landing gear 20 from initiation of landing gear deployment to ensure that the landing gear 20 is deployed by a threshold time and/or distance 215 before aircraft landing.

The controller 100 is configured to issue a first pilot feedback when the first portion 202 of the determined time period and/or distance range 200 is entered by the aircraft, the first pilot feedback indicating that it is safe to deploy the landing gear 20. In some embodiments, the first portion 202 starts at the start point 202 of the determined time period and/or distance range. The controller 100 is configured to issue a second pilot feedback when the second portion 204 of the determined time period and/or distance range 200 is entered by the aircraft (i.e. at point 230 as shown in the example of FIG. 2), the second pilot feedback indicating that the landing gear 20 can be lowered in the efficient landing mode. In some embodiments, the second portion 204 starts at the time and/or distance that the first portion 202 ends. In some embodiments, the start point 230 of the second portion 204 may be determined based on the topography below the flight path 50 of the aircraft during the aircraft landing procedure. For example, the second portion 204 may start after the aircraft has passed over an urban area.

The controller 100 is configured to initiate landing gear deployment when the aircraft is in the determined time period and/or distance range 200, in response to receiving a deployment signal from the pilot.

In some embodiments, the controller 100 is configured to issue a pilot warning if the aircraft passes a threshold time or threshold distance 220 before the controller 100 receives the deployment signal from the pilot. The pilot warning indicates that landing gear deployment is required urgently. The threshold time or distance 220 is within the determined time period and/or distance range 200 and closer to aircraft landing than the second portion 204. As shown in FIG. 2, the threshold time or distance 220 is at the end point of the second portion 204. In other embodiments, the threshold time or distance 220 may be between the end point of the second portion 204 and the end point 210 of the determined time period and/or distance range 200. The threshold time or distance 220 may be based, for example, on a typical response time of a pilot to the pilot warning. Such a feature may help to remind a pilot that the landing gear 20 must be urgently deployed for safe aircraft landing.

In some embodiments, the controller 100 may be configured to issue a third pilot feedback in the event that the aircraft exits the determined time period and/or distance range 200 before the controller receives the deployment signal from the pilot. That is, if the aircraft passes the end point 220 of the determined time period and/or distance range 200 without the deployment signal having been received by the controller 100, the third pilot feedback is issued by the controller 100. The third pilot feedback indicates that initiating landing gear deployment has been performed automatically by the controller 100. Such a feature may help to ensure that a landing gear 20 is deployed at a safe time or distance before aircraft landing even if the pilot has not commanded landing gear deployment.

In some embodiments, the controller 100 may be operable in a first mode in which initiation of landing gear deployment is delayed if the deployment signal is received earlier than it is necessary to initiate landing gear deployment, and a second mode in which initiation of landing gear deployment is performed immediately upon receipt of the deployment signal irrespective of the position of the aircraft relative to the aircraft landing site 40. In some embodiments, for example if the controller 100 is in the first mode, the controller 100 may prevent the pilot from inputting the deployment signal until the aircraft enters the determined time period and/or distance range 200, or the second portion 204 if in the efficient landing mode. For example, a landing gear deployment lever in the aircraft cockpit may only be movable to a deployment position after the aircraft has entered the determined time period and/or distance range 200. In such embodiments, the first pilot feedback may indicate that the pilot can command landing gear deployment.

In some embodiments, the controller 100 may be configured to delay initiation of landing gear deployment until the aircraft enters the determined time period and/or distance range 200, in the event that the deployment signal is received before the aircraft enters the determined time period and/or distance range 200. In such an embodiment, the first pilot feedback may indicate that landing gear deployment has been initiated at the start point 208 of the determined time period and/or distance range 200, the aircraft passing the start point 208 after the deployment signal is received. If the controller 100 is configured to initiate landing gear deployment in the efficient landing mode, the controller 100 may delay initiation of landing gear deployment until the aircraft enters the second portion 204 of the determined time period and/or distance range 200, in the event that the deployment signal is received before the aircraft enters the second portion 204. In such an embodiment, the second pilot feedback may indicate that landing gear deployment has been initiated at a start point 230 of the second portion 204 of the determined time period and/or distance range 200, the aircraft entering the second portion 204 after the deployment signal is received. Such features may help to increase the efficiency of the aircraft landing procedure by ensuring that the landing gear 20 is not deployed earlier than necessary, even if the pilot has already commanded landing gear deployment.

Operation of controllers 100 according to the invention will now be described with reference to FIGS. 2 to 7. FIGS. 3 to 7 are flow diagrams depicting methods according to the present invention, and which may, at least in part, be employed by a controller 100 according to the invention.

A controller 100 may be configured to perform a method 300 according to an embodiment of the invention. The controller 100 may be the controller 100 described with reference to FIG. 2. The method 300 is for deploying a landing gear at a determined aircraft position and is shown as a flow diagram in FIG. 3. The method 300 comprises: receiving an aircraft landing gear deployment signal (block 310), receiving an aircraft position signal indicative of a distance of the aircraft from an aircraft landing site 40 (block 320), receiving one or more flight signals indicating one or more dynamic conditions or parameters (block 330) relating to the flight of the aircraft, determining, based at least on the one or more flight signals, a first aircraft position, relative to the aircraft landing site 40, at which the landing gear deployment should commence (block 340) and deploying the landing gear (a) when the aircraft reaches the first aircraft position, in the event that the deployment signal is received before the aircraft reaches the first aircraft position, or (b) immediately, in the event that the deployment signal is received when the aircraft has passed the first aircraft position (block 350).

Figure 3:
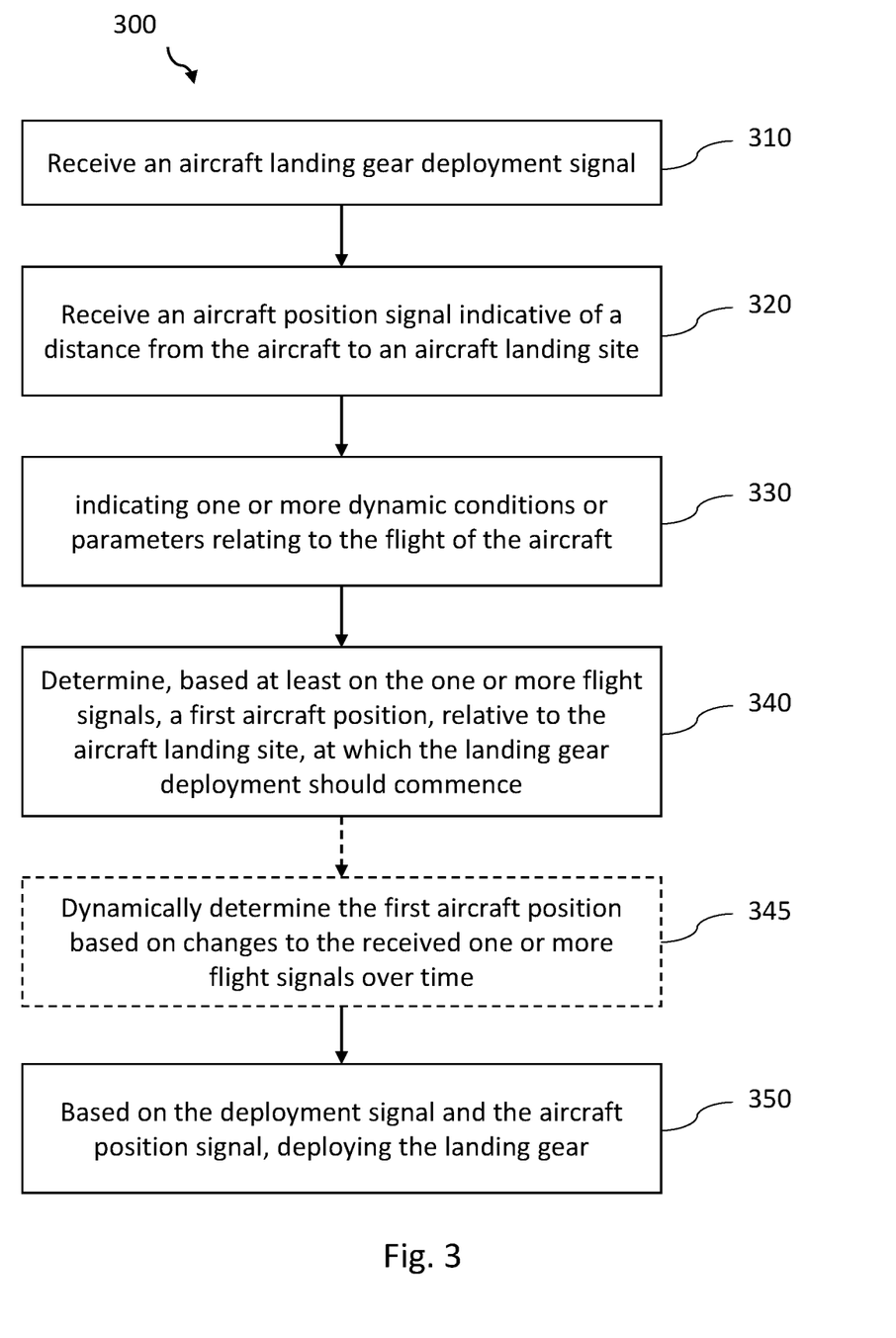
FIG. 3 is a flow diagram depicting a method according to an embodiment of the present invention.

In some embodiments, the controller 100 is configured to receive an aircraft landing gear deployment signal (block 310). The landing gear deployment signal may be generated in response to an input or action by the aircraft pilot. Alternatively, the landing gear deployment signal may be automatically generated by another aircraft system in response to a determination that certain criteria have been met. For example, the landing gear deployment signal may be generated in response to the aircraft descending below a threshold altitude and/or decelerating to below a threshold speed.

The controller 100 is configured to receive an aircraft position signal indicative of a distance of the aircraft from an aircraft landing site 40 (block 320). The aircraft position signal may be received from an aircraft GPS system. Alternatively, the aircraft position signal may be generated in response to a determination of the aircraft position by another aircraft system. The controller 100 may receive the aircraft position signal at frequent intervals as the aircraft approaches the aircraft landing site 40.

The controller 100 is configured to receive one or more flight signals indicating respective one or more dynamic conditions or parameters (block 330) relating to the flight of the aircraft. The one or more flight signals may be received from other aircraft systems configured to measure parameters of the aircraft and/or the environmental conditions surrounding the aircraft.

The controller 100 is configured to determine, based at least on the received one or more flight signals, a first aircraft position 230 (see FIG. 2), relative to the aircraft landing site 40, at which the landing gear 20 should be deployed (block 340). In some embodiments, the first aircraft position 230 represents a position at which landing gear deployment should be initiated so that the aircraft landing is conducted in an efficient landing mode. In some embodiments, in which the controller 100 comprises a memory 110, the controller 100 may be configured to determine the first aircraft position 230 based on aircraft landing site information stored in the memory 110.

The stored aircraft landing site information may include information relating to one or more of: the ground topography under the flight path 50 of the aircraft as it approaches the aircraft landing site 40, the relative difficulty of the approach to the aircraft landing site 40, noise restrictions in place at the aircraft landing site 40, the length of the runway at the aircraft landing site 40 and the condition of the surface of the runway. Information related to the ground topography may include information on the location and size of urban areas under the flight path 50. The relative difficulty of the approach may include information such as the height of buildings or other structures under or near the flight path 50, for example some airports require that aircraft fly close to tall buildings or mountains, which may affect when a landing gear 20 should be deployed. Other information used in determining the first aircraft position 230 may include the time of day; at some airports, noise restrictions are more restrictive later in the evening, so it may be beneficial to delay landing gear deployment until the aircraft is within a certain boundary around the aircraft landing site 40.

The controller 100 is configured to, based on the deployment signal and the aircraft position signal, trigger landing gear deployment (a) in the event that the deployment signal is received before the aircraft reaches the first aircraft position 230, when the aircraft reaches the first aircraft position 230 or (b) immediately, in the event that the deployment signal is received when the aircraft has passed the first aircraft position 230 (block 360). In this way, the controller 100 is configured to delay landing gear deployment if the aircraft landing gear deployment signal is received earlier than the landing gear 20 needs to be deployed, thus helping to increase the efficiency of the aircraft landing procedure. The controller 100 may therefore be configured to modify pilot behaviour to delay landing gear deployment until closer to the latest point at which landing gear deployment can be initiated compared to when a pilot would typically command landing gear deployment.

In some embodiments, the controller 100 (as described with reference to FIG. 2 and/or FIG. 3) may be configured to dynamically determine the first aircraft position 230 based on changes to the received one or more flight signals over time. For example, as the aircraft approaches the aircraft landing site 40 the environmental conditions may change (for example, the wind speed my change), which may influence the calculation of the determined first aircraft position 230. Alternatively, the aircraft may decelerate or descend faster or slower than predicted, which may influence the calculation of the determined first aircraft position 230.

Figure 4:
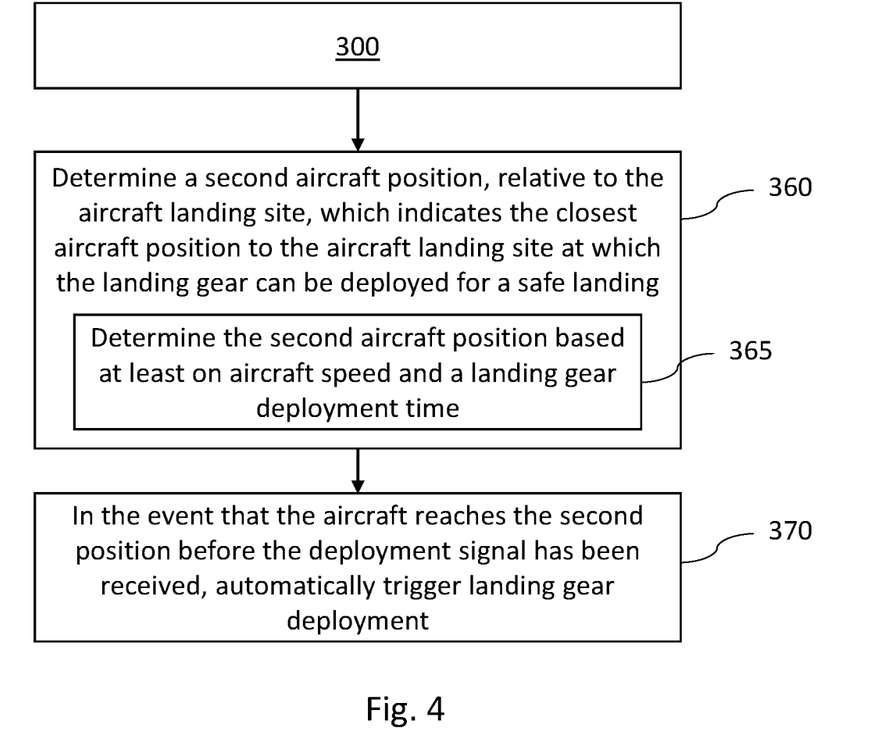
FIG. 4 is a flow diagram depicting a method according to an embodiment of the present invention.

In some embodiments, the controller 100 (as described with reference to FIG. 2 and/or FIG. 3) may be configured to determine a second aircraft position 210 (as shown in FIG. 2), relative to the aircraft landing site 40, which indicates the closest aircraft position to the aircraft landing site 40 at which the landing gear 20 can be deployed for a safe landing (block 360 of FIG. 4). The second aircraft position 210 is closer to the aircraft landing site 40 than the first aircraft position 230. In the event that the aircraft reaches the second position 210 before the deployment signal has been received, the controller 100 may as a precaution be configured to automatically trigger landing gear deployment (block 370 of FIG. 4). In some embodiments, the controller 100 may trigger a warning as the aircraft approaches the second aircraft position 210 to warn the pilot that the landing gear 20 should urgently be deployed. The controller 100 thus acts to determine a latest point 210 before landing by which initiation of landing gear deployment should occur and to either facilitate automatic deployment at that point, or to warn the pilot that he/she should urgently command landing gear deployment before the determined latest point 210.

In this way, the controller 100 can help to ensure that the landing gear 20 is safely deployed before aircraft landing even if no deployment signal is received. In summary, the controller 100 is configured to trigger landing gear deployment at the first aircraft position 230 if the deployment signal has been received, to trigger landing gear deployment immediately upon receipt of the deployment signal if the deployment signal is received when the aircraft is between the first and second aircraft positions 230, 210, or to trigger landing gear deployment when the aircraft reaches the second aircraft position 210 and the deployment signal has not been received.

In some such embodiments, wherein the one or more flight signals comprises an aircraft speed signal, the controller 100 is configured to determine the second aircraft position 210 based at least on aircraft speed and a landing gear deployment time (block 365 of FIG. 4). The controller 100 may determine the second aircraft position 210 based on one or more other factors, which may comprise: a time required to check the status of the landing gear deployment, a safety factor time to allow a go-around in the event that an issue is detected which prevents a safe landing, or a time required for a landing gear shock absorber to equalise after landing gear deployment and before aircraft landing.

In some such embodiments, the controller 100 is configured such that, in the event that the aircraft reaches the second aircraft position 210 before the deployment signal has been received, to trigger accelerated landing gear deployment. That is, the controller 100 may cause the landing gear extension and retraction system 30 to deploy the landing gear 20 in an accelerated mode so that the landing gear deployment time is reduced. For example, in the accelerated mode, the landing gear extension and retraction system 30 may cause the landing gear 20 to move from the retracted position to the extended position at the same time as causing the landing gear doors to move from the closed position to the open position.

Figure 5:
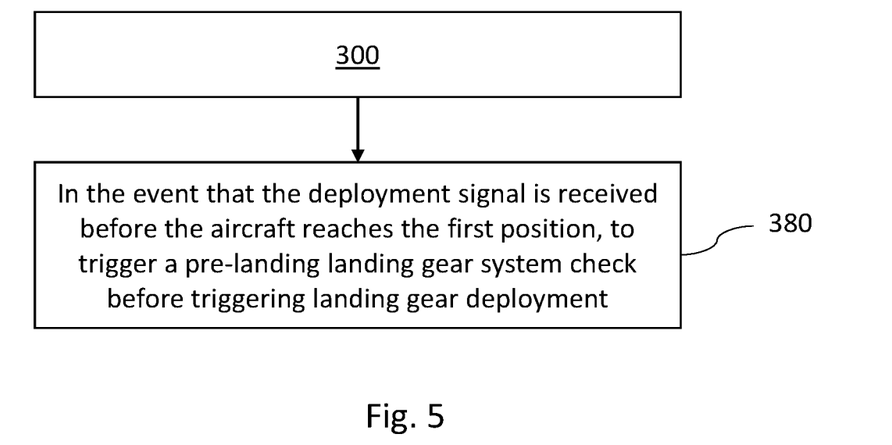
FIG. 5 is a flow diagram depicting a method according to an embodiment of the present invention.

In some embodiments, the controller 100 (as described with reference to FIG. 2 and/or FIG. 3) may be configured, in the event that the deployment signal is received before the aircraft reaches the first aircraft position 230, to trigger a pre-landing landing gear system check before triggering landing gear deployment (block 380 of FIG. 5). Typically, the pre-landing landing gear system check is performed when the landing gear 20 is in the deployed position. However, performing the system check before landing gear deployment permits a later landing gear deployment because less time is needed after landing gear deployment and before aircraft landing.

Figure 6:
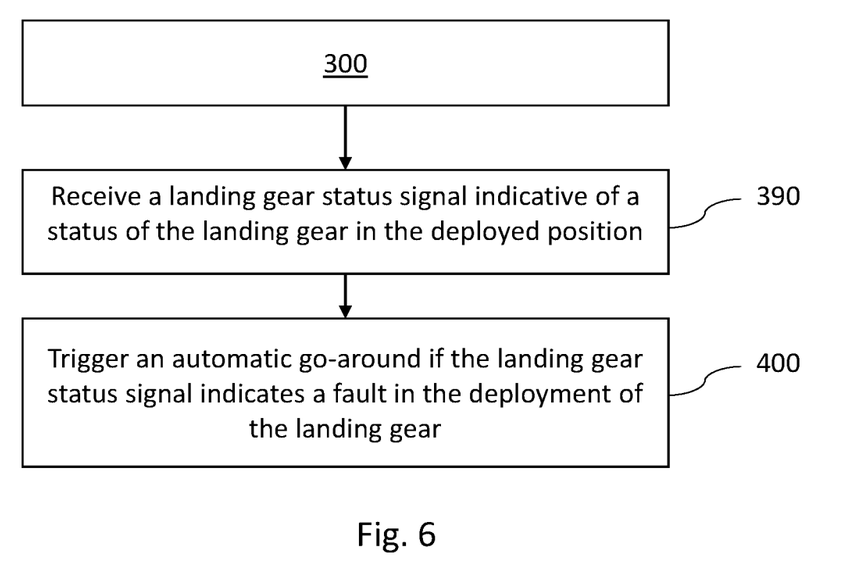
FIG. 6 is a flow diagram depicting a method according to an embodiment of the present invention.

In some embodiments, the controller 100 (as described with reference to FIG. 2 and/or FIG. 3) may be configured to receive a landing gear status signal indicative of a status of the landing gear 20 in the deployed position (block 390 of FIG. 6) and to trigger an automatic go-around if the landing gear status signal indicates a fault in the deployment of the landing gear 20 (block 400 of FIG. 6). For example, the controller 100 may be configured to receive a landing gear downlock signal which indicates whether the landing gear 20 is locked into the extended position and to trigger an automatic go-around if the landing gear 20 is not locked into the extended position within a predetermined time or distance before aircraft landing. For example, with reference to FIG. 2, the controller 100 may initiate an automatic go-around if the landing gear 20 has not successfully deployed before the threshold time and/or distance 215 before aircraft landing.

Figure 7:
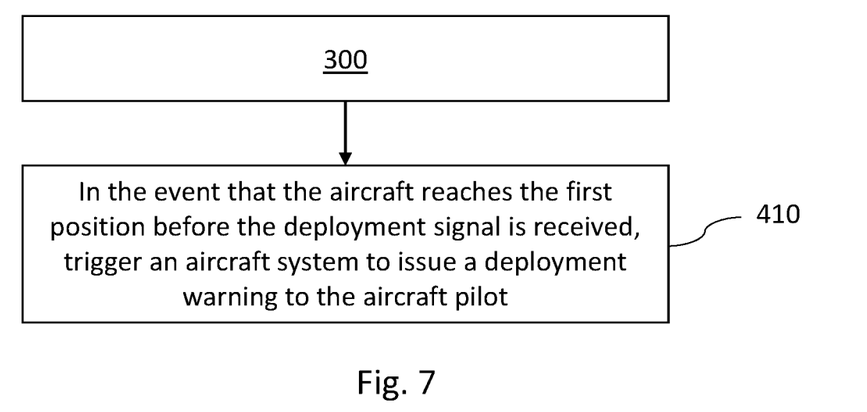
FIG. 7 is a flow diagram depicting a method according to an embodiment of the present invention.

In some embodiments, the controller 100 (as described with reference to FIG. 2 and/or FIG. 3) may be configured, in the event that the aircraft reaches the first aircraft position 230 before the deployment signal is received, to trigger an aircraft system to issue a deployment warning to the aircraft pilot (block 410 of FIG. 7). In this way, the pilot may be reminded to provide an input to generate the deployment signal.

In some embodiments, the controller 100 (as described with reference to FIG. 2 and/or FIG. 3) may be operable in a first mode, as described with reference to FIGS. 2 to 7, and a second mode, in which, in the event that the deployment signal is received before the aircraft reaches the first aircraft position 230, the controller triggers landing gear deployment immediately upon receipt of the landing gear deployment signal. For example, in the second mode, the controller 100 triggers landing gear deployment at the time that the pilot provides an input to generate the deployment signal, even though the aircraft has not reached the first aircraft position 230. In some embodiments, the pilot may select the operating mode of the controller 100. The pilot may select between the first and second modes based on, for example, the aircraft landing site 40, the pilot's experience, the weather conditions or the condition of the aircraft. For example, if there is a known fault with the aircraft, the pilot may select the second mode so that the pilot has greater control over landing gear deployment.

Embodiments of the present invention comprise the method 300, as shown in FIG. 3. In some embodiments, the method 300 comprises determining the first aircraft position and using that determined position to selectively deploy the landing gear 20 based on the relative position of the aircraft compared to the determined position. The method 300 may optionally comprise dynamically determining the first aircraft position 230 based on changes to the received one or more flight signals over time (block 345 of FIG. 3), such that the determined position may change over the course of the aircraft landing procedure based on the most up-to-date information relating to the prevailing conditions available to the controller 100. The method 300 may comprise one or more of the methods shown as flow diagrams in FIGS. 4 to 7, as described above with reference to the controller 100.

In some embodiments of the present invention, the one or more flight signals indicate dynamic parameters of the aircraft, some examples of which have been aforementioned. By way of further example, the one or more flight signals may comprise signals indicating one or more of: aircraft speed, aircraft altitude, aircraft weight, aircraft flap position and direction of landing. In some embodiments, the one or more flight signals indicate atmospheric conditions at or near the aircraft landing site 40. For example, the one or more flight signals may comprise signals indicating one or more of: wind speed and direction, temperature, moisture on the runway, weather conditions.

Figure 8:
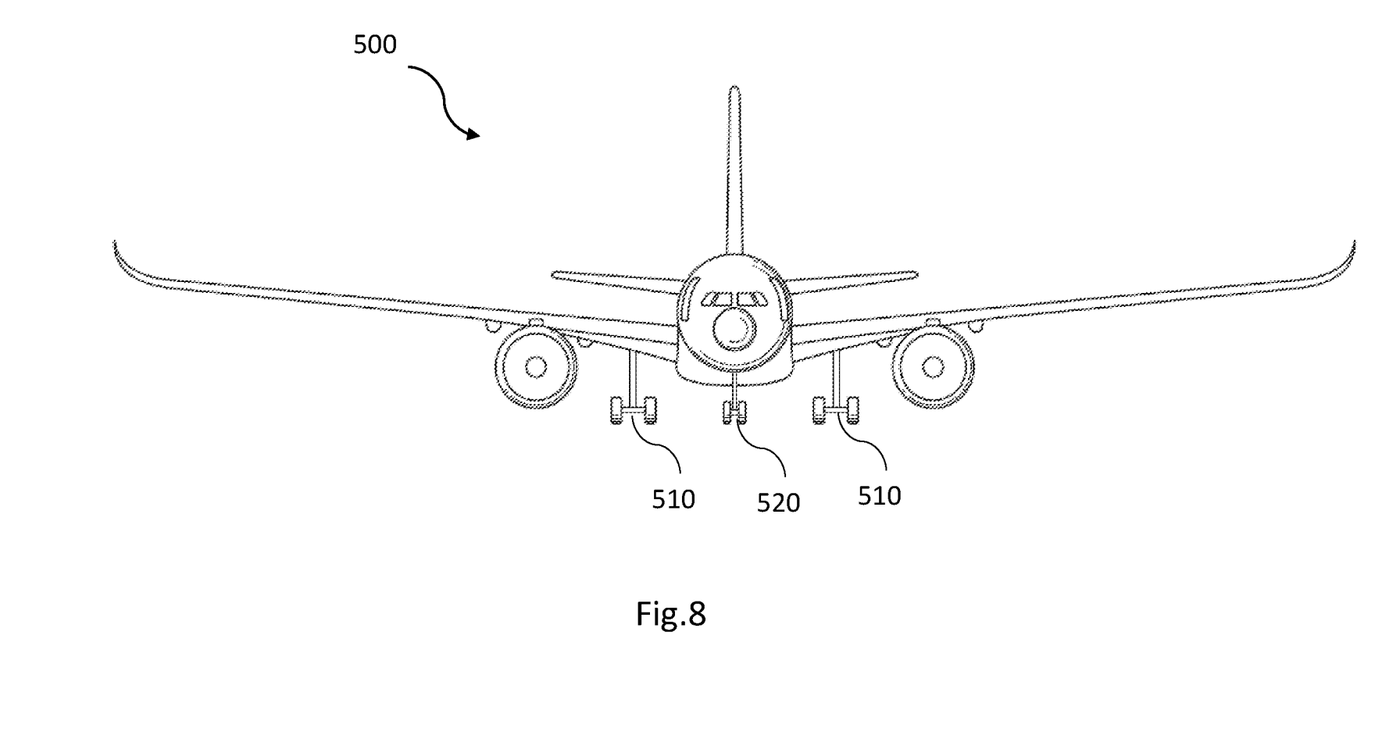
FIG. 8 is a schematic front view of an aircraft according to an embodiment of the present invention.

FIG. 8 shows a schematic front view of an aircraft 500 according to embodiments of the present invention. In this embodiment, the aircraft 500 comprises two main landing gears 510 and a nose landing gear 520. In some embodiments, each landing gear 510, 520 is associated with a corresponding landing gear extension and retraction system (not shown) according to the present invention. In some embodiments, the aircraft 500 comprises one or more controllers (not shown) according to the present invention. The aircraft 500 may comprise one controller 100 per landing gear 510, 520. The aircraft 500 may comprise a common controller 100 for the landing gears 510, 520.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft controller configured to:
receive an aircraft landing gear deployment signal;
receive an aircraft position signal indicative of a distance of an aircraft from an aircraft landing site;
receive one or more flight signals indicating respective one or more dynamic conditions or parameters relating to a flight of the aircraft;
determine, based at least on the received one or more flight signals, a first aircraft position, relative to the aircraft landing site, at which the landing gear should be deployed; and
based on receipt of a landing gear deployment signal and the aircraft position signal, trigger landing gear deployment (a) when the aircraft reaches the first aircraft position, in the event that the deployment signal is received before the aircraft reaches the first aircraft position, or (b) immediately, in the event that the deployment signal is received when the aircraft has passed the first aircraft position,
determine a second aircraft position, nearer to the landing site than the first aircraft position, which represents a closest aircraft position to the aircraft landing site at which the landing gear may can be deployed for a safe landing, and
in the event that the aircraft reaches the second position before receipt of the landing gear deployment signal, automatically trigger the landing gear deployment.

2. The aircraft controller according to claim 1, configured to dynamically determine the first aircraft position based on changes to the received one or more flight signals over time.

3. The aircraft controller according to claim 1, wherein the one or more flight signals indicate dynamic parameters of the aircraft.

4. The aircraft controller according to claim 1, wherein the one or more flight signals indicate atmospheric conditions at or near the aircraft landing site.

5. The aircraft controller according to claim 1 wherein the one or more flight signals comprises an aircraft speed signal, and the controller is configured to determine the second aircraft position based at least on aircraft speed and a landing gear deployment time.

6. The aircraft controller according to claim 1 configured, in the event that the aircraft reaches the second position before the deployment signal has been received, to trigger accelerated landing gear deployment.

7. The aircraft controller according to claim 1, configured to:
receive a landing gear status signal indicative of a status of the landing gear in the deployed position, and
trigger an automatic go-around if the landing gear status signal indicates a fault in the deployment of the landing gear.

8. The aircraft controller according to claim 1, configured, in the event that the deployment signal is received before the aircraft reaches the first aircraft position, to trigger a pre-landing landing gear system check before triggering landing gear deployment.

9. The aircraft controller according to claim 1, comprising a memory configured to store aircraft landing site information, wherein the controller is configured to determine the first aircraft position based on the aircraft landing site information.

10. The aircraft controller according to claim 1, configured, in the event that the aircraft reaches the first aircraft position before the deployment signal is received, to trigger an aircraft system to issue a deployment warning to the aircraft pilot.

11. The aircraft controller according to claim 1, operable in a first mode, and in a second mode, in which, in the event that the deployment signal is received before the aircraft reaches the first aircraft position, the controller triggers landing gear deployment immediately upon receipt of the landing gear deployment signal.

12. The aircraft controller according to claim 11, wherein the mode of the controller is selectable by the aircraft pilot.

13. An aircraft landing gear system, comprising:
an aircraft landing gear movable between a retracted position and an extended position;
an aircraft landing gear extension and retraction system configured to move the landing gear between the retracted position and the extended position; and the aircraft controller according to claim 1, wherein the system is configured such that the trigger for landing gear deployment causes the landing gear extension and retraction system to deploy the landing gear.

14. A method for deploying an aircraft landing gear, the method comprising:
- receiving an aircraft landing gear deployment signal;
- receiving an aircraft position signal indicative of a distance of the aircraft from an aircraft landing site;
- receiving one or more flight signals indicating one or more dynamic conditions or parameters relating to the flight of the aircraft;
- determining, based at least on the one or more flight signals, a first aircraft position, relative to the aircraft landing site, at which the landing gear deployment should commence; and
- deploying the landing gear (a) when the aircraft reaches the first aircraft position, in the event that the deployment signal is received before the aircraft reaches the first aircraft position, or (b) immediately, if the deployment signal is received when the aircraft has passed the first aircraft position,
- determining a second aircraft position, nearer to the landing site than the first aircraft position, which represents a closest aircraft position to the aircraft landing site at which the landing gear may can be deployed for a safe landing, and
- in the event that the aircraft reaches the second position before receipt of the landing gear deployment signal, automatically triggering the landing gear deployment.

* * * * *